Patented Sept. 10, 1946

2,407,599

UNITED STATES PATENT OFFICE 2,407,599

RESINOUS COMPOSITIONS AND PROCESS OF MAKING SAME

Robert W. Auten, Jenkintown, and James L. Rainey, Abington, Pa., assignors to The Resinous Products & Chemical Company, Philadelphia, Pa., a corporation of Delaware No Drawing. Application March 23, 1946, Serial No. 656,784

20 Claims. (Cl. 260—69)

This invention relates to a new kind of nitrogenous thermosetting resin. It relates to the preparation of condensation products of aldehydes with carbamides and/or amino-azines containing salt-forming sulfonate groups.

The present application is a continuation-in-part of our application Serial No. 511,182, filed November 20, 1943.

In accordance with this invention, thermosetting resinous products containing salt-forming sulfonate groups are prepared by reacting together one or more aldehydes, a water-soluble salt of sulfurous acid, and a carbamide or an amino-azine or mixture thereof under conditions such that condensation occurs with the formation of a resinous product. During the condensation, the salt of sulfurous acid takes part in the reaction with the result that salt-forming sulfonate groups are present in the condensate.

Carbamides which may be used include urea, thiourea, di-cyandiamide, and guanidine, or mixtures of two or more of them. Urea is the preferred carbamide.

The carbamides and/or amino-azines suitable for use in accordance herewith contain a sufficient number of reactive hydrogen atoms attached to amino nitrogen atoms so that they react with an aldehyde to form thermosetting resins. These compounds contain two amino groups having two reactive hydrogen atoms each.

Amino-azines which may be employed include aminotriazines, such as melamine, melam, ammeline, thioammeline, β-β'-bis-thioammeline diethyl ether and similar compounds as shown in United States Patent No. 2,217,667, which issued on October 15, 1940. They also include aminodiazines, such as 2,6-diamino-1,3-diazine, 5-methyl-2,6-diamino-1,3-diazine, 4-chloro-2,6-diamino-1,3-diazine, and diazine derivatives such as those shown in the United States Patents Nos. 2,295,564 and 2,312,320. Other amino-azines such as the polyamino pyrimidines, as well as mixtures of the amino-azines above noted, may likewise be used.

Mixtures of carbamides and/or amino-azines which may be used include, for example, urea and thiourea; urea and guanidine; urea and melamine; thiourea, urea and melamine; melamine and thioammeline; urea, melamine and 2,6-diamino-1,3-diazine; melamine and 2,6-diamino-1,3-diazine; urea, thiourea and 2,6-diamino-1,3-diazine, and similar mixtures.

Aldehydes which may be employed include formaldehyde, benzaldehyde, acetaldehyde, butyraldehyde, furfuraldehyde, and mixtures of two or more aldehydes, such as formaldehyde and acetaldehyde; formaldehyde and benzaldehyde; acetaldehyde and furfuraldehyde; formaldehyde, benzaldehyde and furfuraldehyde, and the like. When mixtures of formaldehyde and other aldehydes are used, particularly interesting resins result.

In the production of certain resins within the scope of this invention, formaldehyde is the aldehyde of first choice. While, in such cases, it is preferred that the formaldehyde be used in solution, as in formalin, it may also be used in its polymeric forms, e. g. paraformaldehyde, which yield formaldehyde under the conditions of the reaction. When formaldehyde is used as a reacting component, salt-forming methylene sulfonate groups are present in the resulting resin.

The salts of sulfurous acid employed in accordance herewith include bisulfites per se, sulfites which yield bisulfites under the conditions of the resin-forming reaction, and mixtures of such sulfites and bisulfites. While bisulfites form sulfonate groups in the reaction directly, sulfites of particular utility are those which yield sulfonate groups indirectly, for example by hydrolysis to the bisulfite, exemplified as follows:

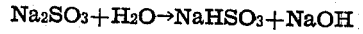

$$Na_2SO_3 + H_2O \rightarrow NaHSO_3 + NaOH$$

Since in the reaction which results in the new resins, bisulfites are immediately used up as they are added or formed, the reaction exemplified above goes to the right.

Employment of sulfurous acid salts of the alkali metals is preferred in most instances. As is well known, these metals form group IA of the periodic table which consists of lithium, sodium, potassium, rubidium, and caesium. From the standpoint of cost and availability, sodium salts, especially sodium metabisulfite of commerce, are particularly useful. Each mol of sodium metabisulfite, when hydrolyzed, yields two mols of $NaHSO_3$. Thus, the number of mols of $NaHSO_3$ required for a given reaction is supplied by using only half that number of mols of $Na_2S_2O_5$. An advantage of using the sulfites of the alkali metals is that the resulting resinous products are very soluble in water. In addition to the salts which have been mentioned above, there may be used sulfurous acid salts of tertiary amines or quaternary ammonium compounds, such as trimethylamine sulfite or benzyl trimethyl ammonium bisulfite.

The use of a bisulfite per se results in a lower pH than does the use of a sulfite per se. When the condensation or polymerization reaction tends to proceed rapidly, it is desirable to employ sulfites, at least in part, in order to take advantage of their higher pH and retarding action on the rate of condensation. When the rate of condensation is slow, bisulfites are preferred since they impart a lower pH to the reaction mixture, thus causing condensation to progress more rapidly.

The ratio of the components in the reaction mixture may be varied widely, depending upon the type of product desired. Each reagent, as well as the amount thereof used, contributes to the final properties of the product.

For example, the ratio of aldehyde to carbamide or aminoazine is of major importance. This ratio of aldehyde may conveniently be based upon the number of reactive amino groups in the molecule of carbamide or amino-azine. For instance, urea has two such groups and melamine, three. A lower ratio of aldehydes is usually employed with carbamides than with amino-azines. Thus, in the case of carbamides, the preferred ratio is about 1.0 to about 1.5 mols of aldehyde per amino group. With urea, for example, the ratio of 2.0 to 3.0 mols of formaldehyde per mol of urea is preferably used. For purposes of economy, the lower ratios are desirably employed, although in some instances ratios approaching the theoretical limit of 2.0 mols of aldehyde per amino group are useful. With amino-azines, the theoretical maximum is still two mols of aldehyde per amino group. For example, 6.0 mols of aldehyde per mol of melamine represents the theoretical maximum.

In actual practice, however, either with carbamides of amino-azines, it is preferable to use less aldehyde than the theoretical maximum in order to obtain resins which convert or "cure" more rapidly to the infusible stage. Compounds prepared with the maximum amount of aldehyde tend to split out aldehyde when heated. The absolute minimum ratio of aldehyde which is operable with either the carbamides or the amino-azines is 0.5 mol per amino group. Resins resulting from the use of this ratio are very reactive. Thus, the entire operable range is 0.5 to about 2.0 mols of aldehyde per amino group in both carbamides and amino-azines, while the preferred ratio is between about 1.0 and about 1.5 mols of aldehyde per amino group.

Of equally great importance is the proportion of the salt of sulfurous acid used in the reaction. Upon the ratio so used depends the number of sulfonate groups which are introduced into the resin molecule. Upon this number depend important properties of the resin. While it is theoretically possible to react as much as one molecule of sulfite for each molecule of aldehyde, it is preferred that a much lower ratio be used. In general, the range of 0.05 to about 0.4 mol of bisulfite per mol of aldehyde has been found to be eminently satisfactory. The expression "mol of bisulfite" used herein and in the appended claims designates a formula weight of a simple bisulfite, $XHSO_3$, wherein X is a single monovalent cation. When compounds such as sodium metabisulfite ($Na_2S_2O_5$) are used as a source of this simple bisulfite ($XHSO_3$), each mol yields more than one molar proportion of the simple bisulfite upon hydrolysis. This fact must be taken into account in connection with the ratios above stated.

In the preparation of the resinous products of this invention, a convenient method is to make the alkylol addition product of the aldehyde and carbamide and/or amino-azine first. When formaldehyde is used, the product is a methylol derivative. After the formation of the addition compound, it is reacted with a water-soluble salt of sulfurous acid.

In another method, the three reactants may be mixed at the outset. Alternatively, the water-soluble salt of sulfurous acid and the aldehyde may be mixed and/or reacted together prior to being combined with the carbamide and/or amino-azine.

There are apparently two reactions proceeding simultaneously, one, the condensation of the resinous product, which proceeds most rapidly at low pH values and which is manifested by an increase in viscosity, and the other, the reaction of the water-soluble salt of sulfurous acid, resulting in the addition of the sulfonate groups.

Conditions of operation will vary, depending on such factors as the amount and choice of the carbamide and/or amino-azine, the ratio and choice of aldehyde, and the type and amount of the water-soluble salt of sulfurous acid. Certain generalizations, however, may be made. Carbamide resins in general tend to condense at a slower rate than the amino-azine resins. Therefore, the carbamide condensation is preferably conducted at a lower pH and/or a higher temperature than the amino-azine condensation.

It is advisable to limit the temperature and pH of the reaction mixture so that the condensation and polymerization of the resin, which are favored by high temperature and low pH, do not proceed so fast that the reaction which produces salt-forming sulfonate groups scarcely occurs.

The range of pH maintained in the condensation of carbamides is preferably lower than that maintained in the condensation of amino-azines. The entire operable pH range over which either carbamides, amino-azines, or mixtures thereof may be used is 4 to 10. In the case of carbamides, the preferred pH range is 4 to 8; and, in the case of amino-azines, it is 7 to 10.

Usually, at a given pH, the rate of condensation may be controlled by regulating the temperature. Preferably, temperatures above 60° C. are employed and the upper limit is ordinarily the boiling point of the reaction mixture. This boiling point depends upon the external pressure, the presence of dissolved salts, and similar factors. For the most part, it is convenient to operate at atmospheric pressure and at temperatures between 60° C. and about 105° C., the latter temperature approximating the point at which water is distilled from the reaction mixtures at normal atmospheric pressure.

The reaction may be carried to any desired extent. As it proceeds, the viscosity of the reaction mixture progressively increases. For this reason, viscosity is a valuable index of the extent of the reaction. The extent to which the reaction is carried will depend, of course, upon the intended use of the product.

The product may be used as is, that is in solution, or it may be concentrated or dried. Drying may be accomplished by conventional methods such as heating, with or without vacuum, drum-drying, or spray-drying. Since the product is thermosetting, care must be exercised, when a soluble product is desired, to conduct the heating and/or drying so as to avoid converting the material to an infusible and insoluble condition. A properly dried resin is extremely stable and may be stored for a period of months with satisfactory retention of its solubility.

The following examples are for purposes of illustration:

Example 1

A mixture of 150 grams of urea (2.5 mols) and 445.5 grams of 37% aqueous formaldehyde (5.5 mols) was simultaneously agitated and heated at 80° C. under reflux in a suitable container equipped with stirrer, thermometer, and reflux condenser. The aqueous formaldehyde had previously been brought to a pH of 7–8 by the addition of a 10% aqueous solution of sodium carbonate. The rate of heating was so regulated that the exothermic reaction resulting in the formation of dimethylolurea did not carry the temperature above 80° C. A total of 47.5 grams of anhydrous sodium metabisulfite, $Na_2S_2O_5$, (0.25 mol) and 4.5 grams (0.25 mol) of water were added and heating was continued. The pH was adjusted to 5.4–6.0, as measured by a Beckman pH meter equipped with a glass electrode, by the cautious addition of a 50% aqueous solution of formic acid. Agitation was continued throughout the reaction, and the pH was carefully controlled while the mixture was heated at refluxing temperature until a viscosity of about 1.4 poises (25° C.) was reached. After a short period of refluxing, the reaction mixture became dilutable in all proportions with water at room temperature. Water solubility remained even after a protracted period of refluxing. When the reaction reached the point where the viscosity of the mixture was 4 poises at 50% solids, it was discontinued. The pH was finally adjusted to 7–8 with a 10% aqueous solution of sodium carbonate.

The rate of viscosity increase may be accelerated by distilling off 35 to 50 grams of water (for the charge given above). While the reaction may be arrested at any stage by cooling the mixture, it has been found that stoppage at a viscosity within the range of from about 1 to about 5 poises for a 50° solution is very satisfactory for general use.

The resinous product resulting from the above is suitable for use directly in the beater in the preparation of paper of high wet strength. It is thermosetting, has high solubility in water, and is very stable at room temperature.

Example 2

Two hundred ninety-one and nine-tenth grams of 37% aqueous formaldehyde (3.6 mols HCHO) was treated in a three-necked flask, equipped with thermometer, stirrer, and condenser, with a 10% solution of sodium carbonate until the pH was adjusted to 5.8–6.2. One hundred and nine-tenth grams (0.8 mol) of melamine was added, and the mixture was stirred and heated to 80° C. under reflux. As soon as the melamine dissolved, the pH was adjusted to 7.0–7.5. The temperature was maintained at 80°–85° C. for ten minutes, during which time methylol melamine was formed. A total of 50.4 grams (0.4 mol) of sodium sulfite was then added, and the pH rose above 9.0. Agitation was continued, and the temperature was maintained at 80°–85° C. for one hour. The pH was then lowered to 8.0–8.5 by careful addition of a 50% aqueous solution of formic acid. Thereafter, the reaction was continued at 80°–85° C. until a viscosity of three poises for a 50% solution was obtained. The pH was then adjusted to 8.5–9.5 with a 10% aqueous solution of sodium carbonate.

The resulting product was thermosetting, extremely soluble in water, and suitable for use in the impregnation of fabrics.

Example 3

One hundred seven and three-tenth grams of chilled redistilled acetaldehyde (at about 10° C.) was added to 100.8 grams of chilled distilled water (at about 10° C.). The pH of the solution was adjusted to 7.2–8.0 with a 10% aqueous sodium carbonate solution. Sixty-six grams of urea was then added.

The above solution was transferred to an autoclave and was heated for one hour under pressure at 75°–82° C. A precipitate formed which was separated by filtration and washed with water. The resulting product, an alkylol derivative of urea, was insoluble in water at concentrations as low as ½% at temperatures as high as 100° C.

To 140 grams of distilled water were added 6.4 grams of sodium metabisulfite and 50 grams of the alkylol urea derivative formed above. The pH was adjusted to 4.2–5.0. The mixture was agitated in a flask provided with a reflux condenser through which brine was circulated at −5° to 0° C. The reaction mixture was heated on an oil bath to gentle reflux. The alkylol urea derivative dissolved readily upon reaction with the metabisulfite. The agitation and refluxing were continued until a one-volume sample showed no precipitation upon dilution with twenty volumes or more of water. Approximately ten minutes' refluxing was required. During this period, the pH rose to the range of 6.0–7.0, which served as further evidence of the reaction of the metabisulfite and the alkylol urea derivative. Finally, the pH was adjusted to 7.0–8.0 with 10% aqueous sodium carbonate solution.

After acidification to a pH of 3.5, the resulting product was baked at 250°–260° F. This yielded clear, colorless films which were hard and brittle at room temperature.

Example 4

The pH of 254 grams of 37% aqueous formaldehyde solution was adjusted to 5.8–6.2 with 10% aqueous sodium carbonate. Sixty-three grams of melamine and thirty grams of urea were added to the formaldehyde solution, and the mixture was agitated and warmed to 80° C. under reflux. As soon as all solid material had dissolved, the pH was adjusted to 7.0–7.5 (glass electrode). The reaction mixture was held at 80°–85° C. for ten minutes, during which time the methylol derivatives were formed. Forty-four and one-tenth grams of sodium sulfite was then added. The formaldehyde-sulfite interaction automatically raised the pH to approximately 9.0.

The reaction mixture was held at 80°–85° C. and was agitated for one hour, after which the pH was lowered to 7.8–8.2 (glass electrode) by careful addition of a 50% aqueous formic acid solution. The reaction was continued at 80°–85° C. until the viscosity increased to 0.5 poise and no precipitation occurred when one volume of the reaction product was diluted with twenty volumes of water.

This resinous product, like those described above, had exceptional water-solubility and contained sulfonate groups.

The products of this invention have distinctive properties and a wide variety of uses. They are thermosetting resinous materials which can be converted to the infusible stage by the application of heat and/or by the catalytic action of acidic agents. In this respect, they resemble the previously known condensates of aldehydes and carbamides, aminodiazines or aminotriazines. In addition, however, they have their own distinctive properties.

Of outstanding importance is the fact that many of the resins, notably the sulfonated resins containg any of the alkali metals of group IA of the periodic table, are soluble in all proportions in water and have varying solubilities in many hydroxylated organic solvents. Moreover, they retain this solubility even when they are very highly condensed. The significance of this is that these new resins can be used or applied in far more dilute solutions than resins known heretofore. This is of particular importance when the new resinous products are used for the sizing or impregnating of fibrous materials such as paper, cloth, wood, etc. The products are particularly valuable in the preparation of special kinds of paper, such as paper of high wet strength. Their advantage lies in the fact that they may be used at the wet end of the paper machine, for example in the beater, machine chest, or head box. These resins remain in solution even in the extremely dilute aqueous mixtures used in paper making. Also, at the same time, they have the additional advantage of being adsorbed by the paper fibers to a far greater extent than any resins known heretofore.

It is impossible to condense resins, for example, of the urea-formaldehyde type to a high state of condensation without corresponding loss in both stability and solubility. As the condensation increases, the solubility and stability decrease. In contrast, the resinous products of this invention may be carried to an unusually high state of condensation without a corresponding loss in stability or solubility. The capacity of these resins to be highly condensed and at the same time to remain water-soluble and stable permits use thereof for numerous purposes for which condensates heretofore known are not adapted.

When these highly condensed resins are used, for example, directly in the beater of a paper machine, they are highly effective because of improved adsorptivity by the cellulose fibers. The ionic charges on the resin molecules may be a futher contributing factor in such applications. This is particularly true when used in conjunction with the salt of a polyvalent cation, such as alum, which does not, however, precipitate the resin. The use of these resins in the preparation of improved paper is the basis of another application, Serial No. 511,183, filed November 20, 1943.

The resinous products of this invention differ chemically as well as physically from all previously known condensates. They contain salt-forming sulfonate groups which impart unique properties thereto. For example, an alkali metal attached to the sulfonate group may be replaced by another metal, such as a heavy metal, either before or after the resin is converted to the infusible state. This reaction may be regarded from the point of view of metathesis, or it may be considered as a simple replacement or exchange of one cation for another. In a specific instance, a piece of pervious material, such as cloth or wood, upon being treated or impregnated with a solution of the new resins containing sodium sulfonate groups and thereafter treated with a solution of a salt of a polyvalent metal, such as copper sulfate, results in the displacement of the sodium by the copper or other polyvalent metal. Thus, the pervious material may be made to contain the polyvalent metal which imparts its own peculiar properties thereto. Various alkaline earth and heavy metal forms of the unconverted resins are insoluble in water. This characteristic is of advantage in those cases where deposition of insoluble metal forms of the resin in or on the fibers of pervious materials is desired. Aside from any properties due to the presence of a resin per se (e. g., anti-crush or improved handle), there are other advantages gained by the presence of the metal constituent. Thus, the treated material may be made to hold such metals as copper, mercury, tin, lead, and/or other metal. As a result, such properties as mildewproofness, resistance to bacterial decomposition, flameproofness, and others may be imparted to the pervious material. After the exchange of metal ions, the resin may still be heat-converted and the properties of such converted resin utilized.

Resins containing metal sulfonate groups, —$SO_3M$, in which M is an equivalent of any metallic element, may be readily converted to the infusible form by the action of heat and/or acidic agents. Among suitable acid catalysts are organic and inorganic acids, such as hydrochloric and oxalic acids, acid salts such as $NaH_2PO_4$, salts which hydrolyze to give acidic solutions, such as alum, ammonium salts such as ammonium sulfate, and so-called latent catalysts, such as chloro- or bromo-acetamide, which liberate acids when heated. Combinations of ammonium salts and soluble sulfites, as disclosed in application Serial No. 448,417, filed June 25, 1942, may also be used.

In another method of utilization, the new resin in solution is applied to a material such as cloth, paper, asbestos, or clay. It is then converted to the infusible stage and thereafter is treated with a salt. This causes exchange of metal ions. Thus, the products of this invention have utilizable cation-exchange properties.

When they are used as ion-exchange resins in their converted, infusible form, the products of this invention are particularly satisfactory because they do not "throw color"; that is, they do not impart any color to solutions being treated therewith. In this particular application, resins condensed from amino-azines, aldehydes, and salts of sulfurous acid are to be preferred over comparable resins based on carbamides, because they are in general less sensitive to aqueous solutions. The use of these new resins as ion-exchange agents is the subject matter of United States application Serial No. 511,352, filed November 22, 1943.

The products of this invention may further be used as casting and laminating resins. They may be used in conjunction with plasticizers, pigments, inert extenders, fillers, starch, cereal flours, and wood flours.

We claim:

1. A process for preparing thermosetting resinous products containing sulfonate groups, which comprises reacting at a pH of 4 to 10 by condensing as the essential reactants (a) an aldehyde from the group consisting of formaldehyde, acetaldehyde, butyraldehyde, furfuraldehyde, and benzaldehyde, (b) a salt from the group consisting of water-soluble metal, tertiary amine, and quaternary ammonium salts of sulfurous acid, and (c) a member of the class consisting of carbamides, polyamino diazines, and polyamino triazines, two amino groups of which have two reactive hydrogen atoms each, at a temperature at which condensation occurs with the formation of a resinous product containing sulfonate groups, the aldehyde being present in an amount between about 0.5 and about 2.0 mols per reactive amino group in said member of the above class and said salt being present in an amount to yield from about 0.05 to about 0.4 mol of bisulfite per mol of aldehyde.

2. A process for preparing thermosetting resinous products containing sulfonate groups, which comprises reacting at a pH of 4 to 10 by condensing as the essential reactants (a) an aldehyde from the group consisting of formaldehyde, acetaldehyde, butyraldehyde, furfuraldehyde, and benzaldehyde, (b) a water-soluble salt of sulfurous acid and an alkali metal of group IA of the periodic table, and (c) a member of the class consisting of carbamides, polyamino diazines, and polyamino triazines, two amino groups of which have two reactive hydrogen atoms each, at a temperature at which condensation occurs with the formation of a resinous product containing sulfonate groups, the aldehyde being present in an amount between about 0.5 and about 2.0 mols per reactive amino group in said member of the above class and said salt being present in an amount to yield from about 0.05 to about 0.4 mol of bisulfite per mol of aldehyde.

3. A process for preparing thermosetting resinous products containing sulfonate groups, which comprises reacting at a pH of 4 to 10 by condensing as the essential reactants (a) formaldehyde, (b) a salt from the group consisting of water-soluble metal, tertiary amine, and quaternary ammonium salts of sulfurous acid, and (c) a member of the class consisting of carbamides, polyamino diazines, and polyamino triazines, two amino groups of which have two reactive hydrogen atoms each, at a temperature at which condensation occurs with the formation of a resinous product containing sulfonate groups, the aldehyde being present in an amount between about 0.5 and about 2.0 mols per reactive amino group in said member of the above class and said salt being present in an amount to yield from about 0.05 to about 0.4 mol of bisulfite per mol of aldehyde.

4. A process for preparing thermosetting resinous products containing sulfonate groups, which comprises reacting at a pH of 4 to 10 by condensing as the essential reactants (a) formaldehyde, (b) a water-soluble salt of sulfurous acid and an alkali metal of group IA of the periodic table, and (c) a member of the class consisting of carbamides, polyamino diazines, and polyamino triazines, two amino groups of which have two reactive hydrogen atoms each, at a temperature at which condensation occurs with the formation of a resinous product containing sulfonate groups, the aldehyde being present in an amount between about 0.5 and about 2.0 mols per reactive amino group in said member of the above class and said salt being present in an amount to yield from about 0.05 to about 0.4 mol of bisulfite per mol of aldehyde.

5. A process for preparing thermosetting resinous products containing sulfonate groups, which comprises reacting at a pH of 4 to 8 by condensing as the essential reactants (a) an aldehyde from the group consisting of formaldehyde, acetaldehyde, butyraldehyde, furfuraldehyde, and benzaldehyde, (b) a salt from the group consisting of water-soluble metal, tertiary amine, and quaternary ammonium salts of sulfurous acid, and (c) urea, at a temperature at which condensation occurs with the formation of a resinous product containing sulfonate groups, the aldehyde being present in an amount from one to four mols per mol of urea and said salt being present in an amount to yield from about 0.05 to about 0.4 mol of bisulfite per mol of aldehyde.

6. A process for preparing thermosetting resinous products containing sulfonate groups, which comprises reacting at a pH of 4 to 8 by condensing as the essential reactants (a) formaldehyde, (b) a water-soluble salt of sulfurous acid and an alkali metal of group IA of the periodic table, and (c) urea, at a temperature between about 60° and about 105° C., the formaldehyde being present in an amount between about 1.0 and about 4.0 mols per mol of urea and said salt being present in an amount to yield from about 0.05 to about 0.4 mol of bisulfite per mol of formaldehyde.

7. A process for preparing thermosetting resinous products containing sulfonate groups, which comprises reacting at a pH of 7 to 10 by condensing as the essential reactants (a) an aldehyde from the group consisting of formaldehyde, acetaldehyde, butyraldehyde, furfuraldehyde, and benzaldehyde, (b) a salt from the group consisting of water-soluble metal, tertiary amine, and quaternary ammonium salts of sulfurous acid, and (c) melamine, at a temperature at which condensation occurs with the formation of a resinous product containing sulfonate groups, the aldehyde being present in an amount between about 1.5 and about 6.0 mols per mol of melamine and said salt being present in an amount to yield from about 0.05 to about 0.4 mol of bisulfite per mol of aldehyde.

8. A process for preparing thermosetting resinous products containing sulfonate groups, which comprises reacting at a pH of 7 to 10 by condensing as the essential reactants (a) formaldehyde, (b) a water-soluble salt of sulfurous acid and an alkali metal of group IA of the periodic table, and (c) melamine, at a temperature between about 60° and about 105° C., the formaldehyde being present in an amount between about 1.5 and about 6.0 mols per mol of melamine and said salt being present in an amount to yield between about 0.05 and about 0.4 mol of bisulfite per mol of formaldehyde.

9. As a new composition of matter, a thermosetting resinous product containing sulfonate groups obtained by condensing at a pH of 4 to 10 as the essential reactants (a) an aldehyde from the group consisting of formaldehyde, acetaldehyde, butyraldehyde, furfuraldehyde, and benzaldehyde, (b) a salt from the group consisting of water-soluble metal, tertiary amine, and quaternary ammonium salts of sulfurous acid, and (c) a member of the class consisting of carbamides, polyamino diazines, and polyamino triazines, two amino groups of which have two reactive hydrogen atoms each, at a temperature at which condensation occurs with the formation of a resinous product containing sulfonate groups, the aldehyde being present in an amount from about 0.5 to about 2.0 mols per reactive amino group in said member of the above class and said salt being present in an amount to yield from about 0.05 to about 0.4 mol of bisulfite per mol of aldehyde.

10. As a new composition of matter, a thermosetting resinous product containing sulfonate groups obtained by condensing at a pH of 4 to 10 as the essential reactants (a) an aldehyde from the group consisting of formaldehyde, acetaldehyde, butyraldehyde, furfuraldehyde, and benzaldehyde, (b) a water-soluble salt of sulfurous acid and an alkali metal of group IA of the periodic table, and (c) a member of the class consisting of carbamides, polyamino diazines, and polyamino triazines, two amino groups of which have two reactive hydrogen atoms each, at a temperature at which condensation occurs with the formation of a resinous product containing sulfonate groups, the aldehyde being present in an amount from about 0.5 to about 2.0 mols per reactive amino group in said member of the above class and said salt being present in an amount to yield from about 0.05 to about 0.4 mol of bisulfite per mol of aldehyde.

11. As a new composition of matter, a thermosetting resinous product containing sulfonate groups obtained by condensing at a pH of 4 to 10 as the essential reactants (a) formaldehyde, (b) a salt from the group consisting of water-soluble metal, tertiary amine, and quaternary ammonium salts of sulfurous acid, and (c) a member of the class consisting of carbamides, polyamino diazines, and polyamino triazines, two amino groups of which have two reactive hydrogen atoms each, at a temperature at which condensation occurs with the formation of a resinous product containing sulfonate groups, the aldehyde being present in an amount from about 0.5 to about 2.0 mols per reactive amino group in said member of the above class and said salt being present in an amount to yield from about 0.05 to about 0.4 mol of bisulfite per mol of formaldehyde.

12. As a new composition of matter, a thermosetting resinous product containing sulfonate groups obtained by condensing at a pH of 4 to 10 as the essential reactants (a) formaldehyde, (b) a water-soluble salt of sulfurous acid and an alkali metal of group IA of the periodic table, and (c)) a member of the class consisting of carbamides, polyamino diazines, and polyamino triazines, two amino groups of which have two reactive hydrogen atoms each, at a temperature at which condensation occurs with the formation of a resinous product containing sulfonate groups, the formaldehyde being present in an amount from about 0.5 to about 2.0 mols per reactive amino group in said member of the above class and said salt being present in an amount to yield from about 0.05 to about 0.4 mol of bisulfite per mol of formaldehyde.

13. As a new composition of matter, a thermosetting resinous product containing sulfonate groups obtained by condensing at a pH of 4 to 8 as the essential reactants (a) an aldehyde from the group consisting of formaldehyde, acetaldehyde, butyraldehyde, furfuraldehyde, and benzaldehyde, (b) a salt from the group consisting of water-soluble metal, tertiary amine, and quaternary ammonium salts of sulfurous acid, and (c) urea, at a temperature at which condensation occurs with the formation of a resinous product containing sulfonate groups, the aldehyde being present in an amount from about 1.0 to about 4.0 mols per mol of urea and said salt being present in an amount to yield from about 0.05 to about 0.4 mol of bisulfite per mol of aldehyde.

14. As a new composition of matter, a thermosetting resinous product containing sulfonate groups obtained by condensing at a pH of 4 to 8 as the essential reactants (a) formaldehyde, (b) a water-soluble salt of sulfurous acid and an alkali metal of group IA of the periodic table, and (c) urea, at a temperature between about 60° and about 105° C., the formaldehyde being present in an amount from about 1.0 to about 4.0 mols per mol of urea and said salt being present in an amount to yield from about 0.05 to about 0.4 mol of bisulfite per mol of formaldehyde.

15. As a new composition of matter, a thermosetting resinous product containing sulfonate groups obtained by condensing at a pH of 7 to 10 as the essential reactance (a) an aldehyde from the group consisting of formaldehyde, acetaldehyde, butyraldehyde, furfuraldehyde, and benzaldehyde, (b) a salt from the group consisting of water-soluble metal, tertiary amine, and quaternary ammonium salts of sulfurous acid, and (c) melamine, at a temperature at which condensation occurs with the formation of a resinous product containing sulfonate groups, the aldehyde being present in an amount from about 1.5 to about 6.0 mols per mol of melamine and said salt being present in an amount to yield from about 0.05 to about 0.4 mol of bisulfite per mol of aldehyde.

16. As a new composition of matter, a thermosetting resinous product containing sulfonate groups obtained by condensing at a pH of 7 to 10 as the essential reactants (a) formaldehyde, (b) a water-soluble salt of sulfurous acid and an alkali metal of group IA of the periodic table, and (c) melamine, at a temperature between about 60° and about 105° C., the formaldehyde being present in an amount from about 1.5 to about 6.0 mols per mol of melamine and said salt being present in an amount to yield from about 0.05 to about 0.4 mol of bisulfite per mol of formaldehyde.

17. A process for preparing thermosetting resinous products containing sulfonate groups, which comprises reacting at a pH of 4 to 10 by condensing as the essential reactants (a) an aldehyde from the group consisting of formaldehyde, acetaldehyde, butyraldehyde, furfuraldehyde, and benzaldehyde, (b) a sodium salt of sulfurous acid, and (c) a member of the class consisting of carbamides, polyamino diazines, and polyamino triazines, two amino groups of which have two reactive hydrogen atoms each, at a temperature at which condensation occurs with the formation of a resinous product containing sulfonate groups, the aldehyde being present in an amount between about 0.5 and about 2.0 mols per reactive amino group in said member of the above class and said salt being present in an amount to yield from about 0.05 to about 0.4 mol of bisulfite per mol of aldehyde.

18. As a new composition of matter, a thermosetting resinous product containing sulfonate groups obtained by condensing at a pH of 4 to 10 as the essential reactants (a) formaldehyde, (b) a sodium salt of sulfurous acid, and (c) a member of the class consisting of carbamides, polyamino diazines, and polyamino triazines, two amino groups of which have two reactive hydrogen atoms each, at a temperature at which condensation occurs with the formation of a resinous product containing sulfonate groups, the formaldehyde being present in an amount from about 0.5 to about 2.0 mols per reactive amino group in said member of the above class and said salt being present in an amount to yield from about 0.05 to about 0.4 mol of bisulfite per mol of formaldehyde.

19. As a new composition of matter, a thermosetting resinous product containing sulfonate groups obtained by condensing at a pH of 4 to 8 as the essential reactants (a) formaldehyde, (b) a sodium salt of sulfurous acid, and (c) urea, at a temperature between about 60° and about 105° C., the formaldehyde being present in an amount from about 1.0 to about 4.0 mols per mol of urea and said salt being present in an amount to yield from about 0.05 to about 0.4 mol of bisulfite per mol of formaldehyde.

20. As a new composition of matter, a thermosetting resinous product containing sulfonate groups obtained by condensing at a pH of 7 to 10 as the essential reactants (a) formaldehyde, (b) a sodium salt of sulfurous acid, and (c) melamine, at a temperature between about 60° and about 105° C., the formaldehyde being present in an amount from about 1.5 to about 6.0 mols per mol of melamine and said salt being present in an amount to yield from about 0.05 to about 0.4 mol of bisulfite per mol of formaldehyde.

ROBERT W. AUTEN.
JAMES L. RAINEY.